US008700434B1

(12) United States Patent
DeLong et al.

(10) Patent No.: US 8,700,434 B1
(45) Date of Patent: Apr. 15, 2014

(54) SYSTEM AND METHOD FOR ANALYZING AND COMPARING DATA AND USING ANALYZED DATA TO IDENTIFY LIABILITY SOURCES

(76) Inventors: Louis H. DeLong, Jefferson, LA (US); Greg DeLong, Jefferson, LA (US)

( * ) Notice: Subject to any disclaimer, the term of this patent is extended or adjusted under 35 U.S.C. 154(b) by 0 days.

(21) Appl. No.: 13/429,003

(22) Filed: Mar. 23, 2012

Related U.S. Application Data

(60) Provisional application No. 61/467,014, filed on Mar. 24, 2011.

(51) Int. Cl.
*G06F 15/18* (2006.01)
(52) U.S. Cl.
USPC .............................................. 705/4; 383/286
(58) Field of Classification Search
USPC .............................. 705/4; 707/104.1; 382/286
See application file for complete search history.

(56) References Cited

U.S. PATENT DOCUMENTS

| 2004/0111301 | A1* | 6/2004 | Wahlbin et al. | 705/4 |
|---|---|---|---|---|
| 2008/0306996 | A1* | 12/2008 | McClellan et al. | 707/104.1 |
| 2012/0076437 | A1* | 3/2012 | King | 382/286 |
| 2012/0109690 | A1* | 5/2012 | Weinrauch et al. | 705/4 |
| 2012/0130751 | A1* | 5/2012 | McHugh et al. | 705/4 |

* cited by examiner

*Primary Examiner* — Samica L Norman
(74) *Attorney, Agent, or Firm* — Andrew Vicknair

(57) ABSTRACT

A method for analyzing and comparing data from various sources, extracting data from the various sources, converting the data into a particular format, and using that data to generate data records, data documents, and/or reports to assist in isolating medical expenses incurred as a result of automobile accidents and further processing the data to identify whether or not potential third parties may be liable/responsible for the medical expenses incurred from the specific automobile accident.

17 Claims, 4 Drawing Sheets

SYSTEM AND METHOD FOR ANALYZING AND COMPARING DATA AND USING ANALYZED DATA TO IDENTIFY LIABILITY SOURCES

CROSS REFERENCE TO RELATED APPLICATIONS

This application claims the benefit of U.S. provisional application Ser. No. 61/467,014 filed on Mar. 24, 2011.

TECHNICAL FIELD

The present invention relates, in general to data analysis and data comparison systems and methods, and more specifically to the analyzing and comparing data related to medical services provided to individuals and using the analyzed data to identify potential financially responsible parties and liability sources that may be used as a source or recovery for expenses associated with the medical services.

BACKGROUND OF INVENTION

Currently, millions of dollars each year are utilized to cover medical expenses incurred in providing various medical services for low income individuals on various forms of government assistance, such as welfare and Medicaid and for elderly individuals that utilize Medicare. These medical expenses are primarily paid for by public funds, public health insurers, and private health insurers.

When medical services associated with trauma related care, such as automobile accidents, are provided to the low income individuals utilizing Medicaid and elderly individuals utilizing Medicare, the expenses associated with these medical services are primarily covered by either Medicaid or Medicare, depending on the type of benefits utilized by the individual receiving medical care. The funds covering such medial expenses are typically public dollars and put a strain on many budgets such as Medicaid and Medicare. The problem with this current system is that the public insurers, such as Medicaid and Medicare, are unable to fully recover funds expended on medical services in a situation where some third party is at fault and likely financially responsible for the medical expenses. For example, if a low-income individual on Medicaid or an elderly individual on Medicare is involved in a car accident in which a third party is at fault, any medical expenses incurred in the course of medical treatment obtained due to the accident will primarily be paid by the public insurer, such as Medicare or Medicaid, regardless of the fact that the third party is at fault in the accident, financially responsible, and should pay for these medical expenses. While state and federal governmental agencies do attempt to recover funds from responsible parties, there is no efficient way for a state and/or federal agency or private and public insurer to do so. Public and private insurers as simply unable to effectively gather data to enable them to pursue third parties at fault or the third parties' insurers to recover medical expenses incurred due to the third parties' liability.

In a majority of States, the automotive insurer of the "at fault" vehicle/driver is responsible monetarily, for all or a portion of the expenses and costs of medical services incurred by the "non-fault" party. However, many insurers, especially public insurers, do not adequately receive compensation from the "at fault" vehicle/driver or the "at fault" driver's automotive insurer because of the lack of definitive data regarding the accident including but not limited to the financially responsible automotive insurer's information. These insurers are losing millions, possibly hundreds of millions of dollars in uncollected compensation because of this lack of data.

Accordingly, a need exists in the art for a system and method that allows individuals to analyze data related to trauma related accidents, such as automobile accidents, from various different sources regardless of data format and utilize the data to assist in identifying potential liability sources.

BRIEF SUMMARY OF THE INVENTION

The present invention is directed to a system and method for analyzing and comparing data from various sources, extracting data from the various sources, converting the data into a particular format, and using that data to generate data records, data documents, and/or reports to assist in isolating medical expenses incurred as a result of automobile accidents and further processing the data to identify whether or not potential third parties may be liable/responsible for the medical expenses incurred from the specific automobile accident.

In one embodiment, the present invention will extract data for all available auto accidents, isolate the individuals involved in the accident, such as drivers, passengers, and any other individuals that were not passengers or drivers that were involved in the accident, isolate data about which vehicle/driver was initially identified as the "at fault" vehicle/driver—who may be identified as the financially responsible party, gather all insurance information about the parties involved in the accident, and generate a unique database of information containing a specific accident data record for each accident analyzed. The present invention can then compare this compiled data to a database of medical claims data to determine if any individuals involved in the accident had claims paid for medical expenses. At this point, the present invention may isolate the specific individuals involved in the accident with medical claims paid and then compare that data with insurance data and "at fault" data to determine if the "at fault" vehicle/driver or the "at fault" insurer has paid any part of the medical expenses.

After analyzing the insurance data, medical claims paid data, and accident data, the present invention can generate various data records that identify potential third parties that may be liable/responsible for payment of medical expenses associated with individuals involved in the accident. This end data may then be used by various individuals/entities to recover medical expenses that they may have paid when in fact some other party, such as an "at fault" driver and/or the "at fault" vehicle's/driver's insurer is responsible for the medical expenses.

The foregoing has outlined rather broadly the features and technical advantages of the present invention in order that the detailed description of the invention that follows may be better understood. Additional features and advantages of the invention will be described hereinafter, which form the subject of the invention. It should be appreciated that the conception and specific embodiment disclosed may be readily utilized as a basis for modifying or designing other structures for carrying out the same purposes of the present invention. It should also be realized that such equivalent constructions do not depart from the invention. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
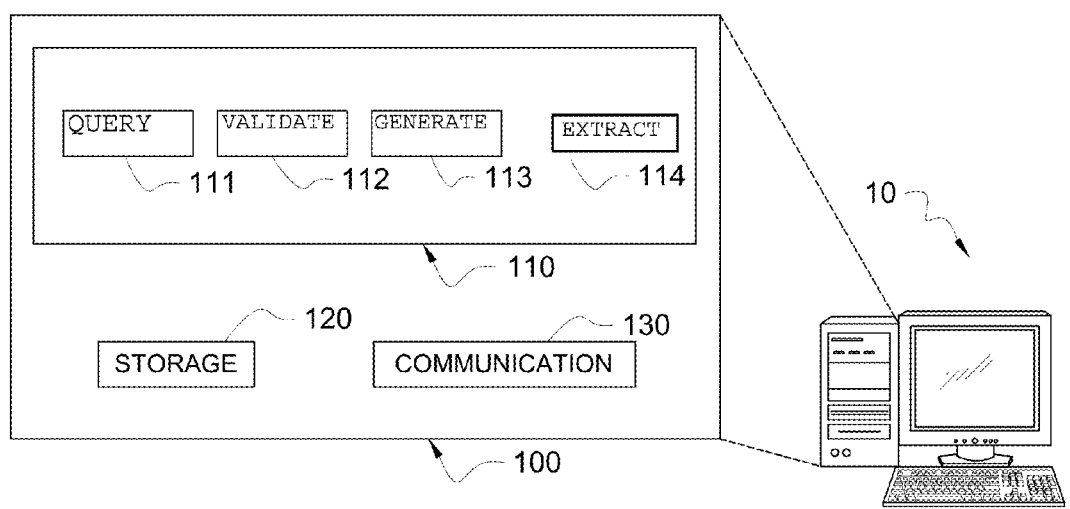
FIG. 1 is an illustration of a general architecture of a system of one embodiment of the present invention.

FIG. 1 is a diagram illustrating data analysis-validation-generation environment 100 according to one embodiment of the present invention implemented on computer 10 for analyzing and comparing data to generate a record for identifying a source of liability and potential source of recovery. A source of liability and potential source of recovery for medical expenses incurred due to an individual's involvement in an automobile accident may be generated by gathering and querying auto-accident and medical treatment and expense related data from various sources, extracting various data, validating the data and generating a new data record based on the data analysis. The newly generated data record may consist of detailed information about an "at-fault" driver and the "at-fault" driver's insurer to assist in identifying a financially responsible party and a source of recovery In addition to data analysis-validation-generation environment 100, the computer system may include an operating system, a computer's coordinating program that is built on the instruction set for a processor or microprocessor, and the hardware that performs the logic operations and manages the data movement of the computer.

Data analysis-validation-generation environment 100 represents one application running on computer 10. In one embodiment of the present invention, data analysis-validation-generation environment 100 includes data module 110, storage module 120, and communication module 130. Data module 110 may also include query sub-module 111, validation sub-module 112, generation sub-module 113 and extraction sub-module 114. Data analysis-validation-generation environment 100 is advantageous as it may be used to analyze specialized automobile accident related data and medical related data associated with individuals involved in automobile accidents from various sources, extract data from these sources, validate the data, and generate accident data records; third party liability data records, and any number of other data records a user desires.

Although FIG. 1 illustrates data module 110 with only four sub-modules, query sub-module 111, validation sub-module 112, generation sub-module 113 and extraction sub-module 114, the present invention is not limited to this configuration. In alternative embodiments of the present invention, data module 110 may include several other sub-modules in addition to sub-modules 111, 112, 113, and 114.

Storage module 120 enables the saving and storing of data, such as accident data records and third party liability data records. After accident data records, third party data records, and automobile accident specific third party liability reports have been created, storage module 120 allows the user to save these data records and reports. Storage module 120 may also allow a user to save any specific data that is analyzed during the data analysis, extraction, and generation process. For example, if the data analysis reveals a pattern of a particular "at fault" insurer for not paying policy limits or not paying for medical expenses incurred in the course of an automobile accident, a user can store various details and/or notes about the "at fault" insurer that can be retrieved at a later date by a user.

Communication module 130 enables a user to communicate with others and access external databases located in remote locations when in the process of analyzing and validating data in using the present invention. In one embodiment of the present invention, this is accomplished by communication module 130 handling any data, such as validating a specific accident data record against an external third party database, such as a driver's ID database. Communication module 130 may communicate data, such as accident data records or data reports to third parties by, sending an electronic message, sending an email, sending an Short Message Service (SMS) message, sending a text message, any combination of the above, and the like.

Data module 110 will query and analyze data, such as automobile accident data and medical related data associated with individuals involved in automobile accidents, from different data sources, extract the data from various data sources, validate the extracted data, and generate a unique data record that may include any number of data fields that can be used by an end user to determine if other individuals/entities are potentially liable or responsible for medical expenses stemming or related to specific automobile accidents. The present invention may also assemble the unique data records into a database or multiple databases. In one embodiment, the present invention may assemble the extracted and validated data at different stages and create different databases at the different stages. For example, data module 110 may create an accident information database of specific and unique automobile accident data records that contain various types of information that is specific to a particular automobile accident. Each accident data record included in the accident information database will be unique/specific to a particular automobile accident. After the accident information database of accident data records is generated, the present invention may proceed with further data extracting of other data, such as (1) medical data associated with individuals involved in or related to the specific automobile accident that is part of a particular accident data record and (2) vehicle and insurance data specific to an "at fault" vehicle or individual that is also associated with the automobile accident that is part of a particular accident data record. This additional data may be obtained from other data sources. After this additional data is extracted and correlated, a third party liability data record may be created and stored in a second database which will assist in identifying potential third parties that are potentially liable for costs associated with an automobile accident, such as medical expenses for individuals injured in the auto accident.

Querying data from different data sources may be accomplished by query sub-module 111. In one embodiment of the present invention, query sub-module 111 may query data from any data source, such as accident databases that are often maintained by various states. Often, states maintain a database of automobile accidents and transport the databases and/or data to the National Department of Transportation. Query sub-module 111 may also query data from a judicial database, which is a database of legal automobile accident case information that often contains data about the party/individual who is determined or declared to be "at fault" for the accident and/or declared to be financially responsible for the automobile accident. For example, an "at fault" party/individual who is declared financially responsible for the accident may be a driver, and/or the "at fault" driver's insurance company. The present invention is not limited to querying data from accident database and judicial database discussed herein as the present invention may query data from any available source now existing or which may be created in the future. In querying data from different data sources, such as accident database and judicial database, query sub-module 111 may search for any number of types of data, such as the date of the accident, time of the accident, location of the accident, individuals involved in the accidents, such as drivers, passengers, pedestrians and the like.

As query sub-module 111 queries data, the various accident related data is validated via validate sub-module 112. In one embodiment of the present invention, validate sub-module 112 may validate various portions of data that is queried via query sub-module 111 by comparing a specific piece of data against other data sources to validate the data. For example, if query sub-module 111 has queried data from one database that is specific to one auto accident, validate sub-module 112 can take the queried data and compare that data to identical data for the same auto accident in another database or data source to validate that the data associated with the specific auto accident is correct. For example, if data associated with an accident involving driver A on Mar. 15, 2000 that involved a Ford Mustang and a Chevy Impala where the Mustang was identified as the "at fault" vehicle was queried from an accident database, then validate sub-module 112 may validate that accident data by comparing it to data for the same accident that was queried from judicial database. If the data is validated then the method of the present invention will move forward with that specific accident data being identified as being validated. However, if the data obtained from the accident database does not match the data obtained from the judicial database, then validate sub-module 112 will flag the specific accident data as having a validation error where the specific data that does not match up will be specifically flagged for further research as the process continues.

After data is validated or flagged as having a validation error, the present invention may extract the specific accident data that was queried and that underwent validation via extraction sub-module 114. In an embodiment of the present invention, extraction sub-module 114 may extract all data associated with a specific accident, or the present invention may prompt a user to identify what specific data is to be extracted. As the data is extracted by extraction sub-module 114, extraction sub-module 114 may place the data into a temporary format until final processing is completed. In alternative embodiments, extraction sub-module 114 may create a new database that stores all extracted data into a user specified format so that the data can be further passed along for further analysis and validation as data analysis-validation-generation environment 100 proceeds in identifying third parties that are potentially liable for medical expenses incurred as a result of medical services provided to individuals injured in automobile accidents.

Generating reports to be used by end users to determine if and what third party sources are potentially responsible/liable for medical expenses incurred due to an automobile accident may be accomplished via generate sub-module 113. Generate sub-module 113 will handle data, such as data extracted via extraction sub-module 114, and generate any number of reports, specific data fields, and the like that a user may ask for during the process of the present invention. For example, after accident data (driver data, date of accident, individuals involved in accident, "at fault" vehicle, "at fault" driver, "at fault" insurer, etc) has been extracted from various sources and compared, validated and queried with medical data (medical expenses incurred by individuals inured in accident, whether expenses/claims were paid, who paid claim, etc.) generate sub-module 113 can generate a new data record and/or report that summarizes the compared data so that the end user can review the report and utilize the report to determine if any third parties potentially liable or responsible for the medical expenses exist and if so have these third parties made payment for the medical expenses.

The program code segments making up data analysis-validation-generation environment 100 can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, and erasable ROM (EROM), a floppy diskette, a compact disk CD-ROM, an optical disk, a hard disk, a fiber optic medium, a radio frequency (RF) link, etcetera. The computer data signal that can propagate over a transmission medium such as electronic network channels, optical fibers, air, electromagnetic, RF links, etcetera. The code segments may be downloaded via computer networks such as the Internet, Intranet, and the like.

Data analysis-validation-generation environment 100 may also be configured in one embodiment of the present invention to assemble these accident data records into a database of automobile accident profiles that may contain various types of information about an automobile accident, such as date of an accident, time and location of accident, driver's information, passenger data, vehicle data, insurance information for the vehicle/driver, whether a driver was issued a traffic ticket or assigned fault and/or financial responsibility for the accident, whether anyone was injured in the accident, such as driver, passenger, pedestrians, etc., and the personal information of any individuals injured in the accident, and the like.

In one embodiment of the present invention, after data analysis-validation-generation environment 100 generates an accident data record, it may further compare and validate the accident data record to other data sources, such as a driver's ID database and an insured motorist database in order to further validate the data that may be part of the accident data record. A driver's ID database may be a database of driver's licenses that are routinely maintained by states that contains a state's data on a registered motor vehicle and/or registered drivers or individuals with some type of state issued identification. An insured motorists' database may be a database maintained by a state that contains a state's data about insurance maintained for registered motor vehicles and/or insurance maintained for a registered driver. The present invention is not limited to comparing data to the specific databases listed above as any number of databases may be used with the present invention for comparing accident data records to similar data.

After further validation, data analysis-validation-generation environment 100 may analyze and compare data associated with individuals that were identified as injured in the accident data record to an additional source of data, such as a paid claims database. A paid claims database may be a database that may be maintained by a medical facility, Medicare, Medicaid, Department of Health and Hospitals, other state agency, or other third party, which stores data about medical services provided to individuals and the costs associated with said medical services. These databases may include data about an individual injured in an accident, such as an individual's identifying data (name, date or birth, address, etc.), the date medical services were provided to the individual, the type of injury or illness treated, costs/expenses of the medical services provided, amounts paid for the medical services provided to the individual, who paid for the medical services, and the like. In comparing the accident data record to a paid claims database or other similar database, the present invention may extract medical claims data associated with individuals in an accident data record and either update the accident data record to include the medical claims data or create a new data record containing the accident data and the medical claims data.

In addition to comparing data with a database such as a paid claims database, data analysis-validation-generation environment 100 may further examine and query the accident data record to identify the individual and/or vehicle identified as being "at fault" for a particular automobile accident. Next, the present invention may extract data associated with the "at fault" and/or financially responsible driver and/or the "at fault" vehicle, such as the vehicle name, vehicle id number (VIN number), make, model and year of the vehicle, the driver's name, date of birth, address, insurance information associated with the "at fault" vehicle and/or driver, and validate this extracted data to increase accuracy of the data. After this "at fault" data is validated, the present invention may obtain additional information related to the insurer of the "at fault" vehicle and/or driver. For example, the present invention may take the extracted "at fault" data and correlate that information with other available information, such as an insurer's database, the Fair Isaac® database, and the like, that can be used to further obtain information about the insurer, the policy on the "at fault" vehicle and/or driver and help to further identify the insurer of the "at fault" vehicle and/or driver to further identify the "at fault" and/or financially responsible party. For example, in further identifying the insurer, the present invention can obtain, identify, and extract contact information of the insurer, policy data (policy limits, policy periods, and the like) and other available data from any number of additional data sources containing data on insurers and policies. Any additional insurer data will preferably be appended to the data obtained for the "at fault" vehicle and/or driver.

After analyzing the "at fault" driver and insurer data, data analysis-validation-generation environment 100 may correlate the accident data record, now including the additional "at fault" data, with the medical claims paid data. In comparing the data, the present invention will search to determine if any medical expenses have been incurred and claims paid for any individuals that are listed as being involved in an accident in the accident data record. If the comparison reveals that an individual identified in the accident data record is also identified as having received medical services with medical claims paid in the medical claims paid database, then the present invention will further identify and examine that specific data to determine if any potential financial responsibility exists for the medical claims that exist and whether the medical expenses have been paid in full or not in determining the existence of a potential financial responsibility.

If the present invention determines that possible financial responsibility exists, then the data from the accident data report, including the "at fault" data and insurer data along with the data from the medical claims paid database will be extracted and a new data record, a third party liability data record, will be generated and stored in a newly created "paid claims with third party liability database." The third party liability data record may then be used to identify individuals involved in auto accidents that received medical services, the costs of the those medical services, who paid for those medical services, the identity of the "at fault" party and vehicle, the identify of the insurer that insured the "at fault" party and/or vehicle who may be responsible for paying for the medical services received by the injured individual(s), the details of the insurer and insurance policy in effect for the "at fault" vehicle and/or party, whether the "at fault" party and/or insurer has paid for the medical services, and the contact information of all related parties and insurers. After the third party liability data record is generated, the present invention may generate an automobile accident specific third party liability report that may highlight the third party liability data record whereby the report can be sent for human review to determine if any third party, such as an insurer or "at fault" part is responsible for the medical expenses associated with medical services provided to individuals involved in an auto accident.

With the third party liability report that may highlight the third party liability data record, an end user, such as a state agency, a Medicaid department, private insurance company, or other entity can use this report to determine if they can subrogate and seek recovery for any funds they have expended in covering medical expenses that someone else, such as the financially responsible and/or "at fault" party or the insurer of the "at fault" vehicle or party, is responsible for paying.

Figure 2:
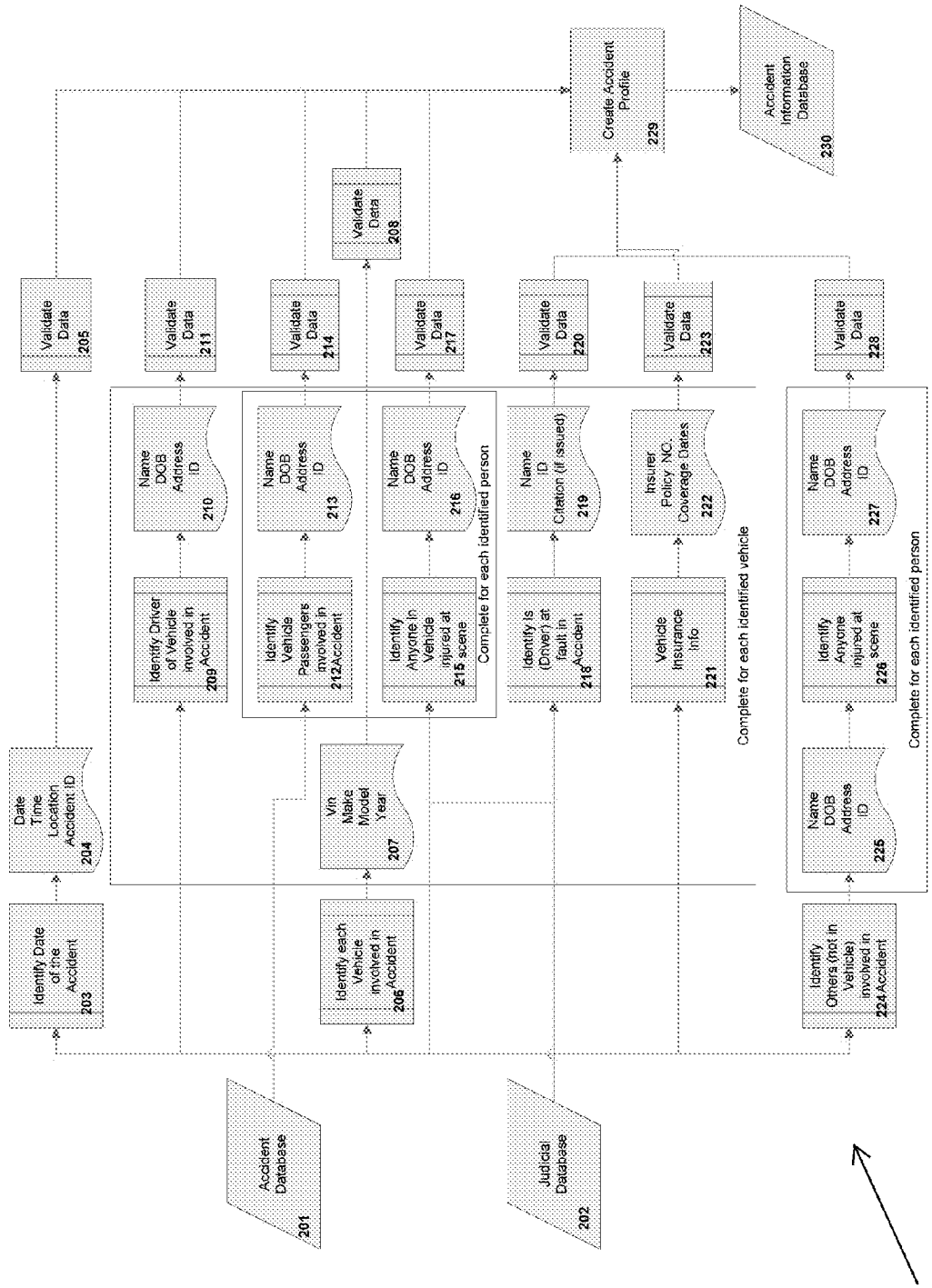
FIG. 2 illustrates a flowchart illustrating steps implemented in an embodiment of the present invention.
Figure 3:
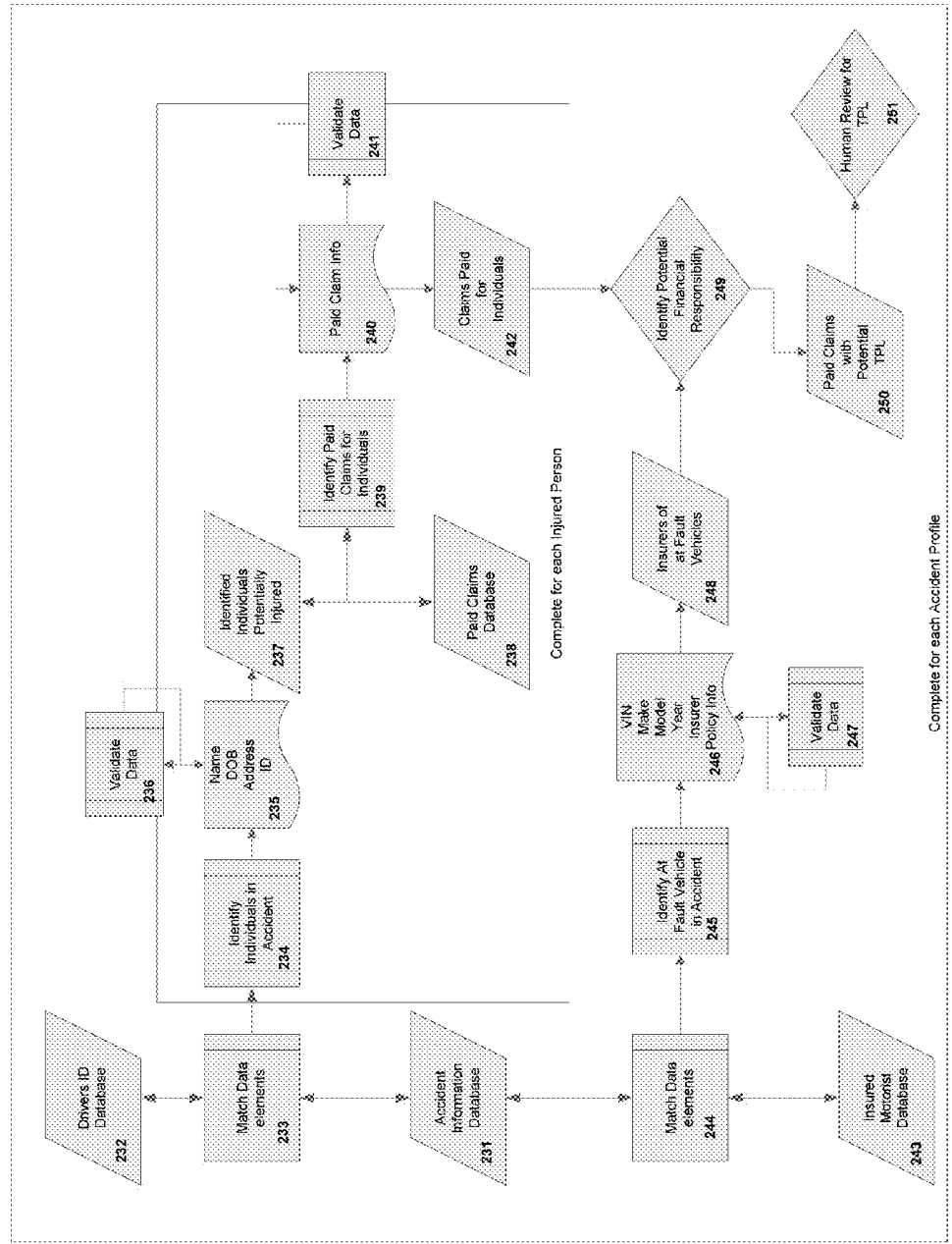
FIG. 3 illustrates a flowchart illustrating steps implemented in an embodiment of the present invention.

FIGS. 2 and 3 are flowcharts illustrating steps implemented in analyzing, extracting and validating data from various sources to identify potential third parties that are liable for specific medical expenses incurred from medical services provided to individuals injured in an auto accident that may have previously been paid by other sources, such as Medicaid, Medicare, or some private health insurer. Flow 20, illustrated in FIGS. 2 and 3, represents a method for analyzing, querying, and comparing data related to automobile accidents and medical services provided to individuals involved in automobile accidents and using the analyzed data to identify third parties that are potentially financially responsible for medical expenses associated with treating the injured individuals.

While the blocks in FIGS. 2 and 3 represent part of flow 20, the various numbers are used to identify components of the diagrams and are not limitations of the present invention and do not indicate a specific order of flow of the present invention. Further, the flow of the present invention and the various processes represented in FIGS. 2 and 3 may be run in parallel and are not restricted by the position in FIGS. 2 and 3.

Blocks 201 and 202 represent third party databases that data analysis-validation-generation environment 100 of the present invention may access in comparing, querying, and validating various data, such as accident related data. Accident database 201 may be a database of automotive accidents that may be sent by states to the National Department of Transportation. The accident information included in accident database 201 is primarily captured at the scene of the accident by the responding police or traffic officer and eventually submitted to the state database system, accident database 201.

Block 202 may be a judicial database of civil suits involving automotive accidents and the results/outcome of these civil suits. The data contained in judicial database 202 will include data identifying the responsible or liable party as determined by the civil suit. While FIG. 2 illustrates accident database and judicial database in blocks 201 and 202, the present invention is not limited to this configuration as any database maintained by any third party containing the required data may be used by the present invention.

In block 203, data analysis-validation-generation environment 100 will query the data contained in database 201 and 202 to determine a specific accident and then gather the date/time of the specific automobile accident. Note that many of the data records contained in accident database 201 may also be contained in judicial database 202, which will enable the present invention to validate the various portions of data by comparing the specific data in one database against the corresponding data in the second database. After block 203, flow 20 may proceed to block 204. In block 204, the location of the accident is obtained, and a unique accident identifier is created for the specific accident being queried. In addition, a time/location data file/document header containing the location of the accident, the information obtained in block 203 (such as date of the accident including day/month/year, time of the accident including hour/minute), and the unique accident identifier is created. In one embodiment of the present invention, this time/location data file/document header will act as the header for all data contained in the data documents in blocks 207, 210, 213, 216, 219, 222, and 227.

After block 204, flow 20 may proceed to block 205. In block 205, all of the data in the data document regarding a specific accident that was present in block 204, such as date, time, location of accident, will be validated. In one embodiment, the present invention will validate the reasonableness and accuracy of the data in the data document. In validating the data, the data may be compared to other data sources containing identical data. Any incorrect data will be corrected and revalidated, and if any data can not be validated, then the specific un-validated data will be annotated as such for further analysis.

At block 206, the identity of each unique vehicle involved in the specific automobile accident previously queried in block 203 is queried from blocks 201 and 202 or some other data source. In querying the uniqueness of the vehicle, identifying data such as the VIN, Make, Model, Color, and Year are obtained. The identifying data elements for a unique vehicle are obtained and stored in a data document illustrated by block 207. Each unique vehicle involved in the accident may have its own data document containing its specific identifying data. In one embodiment of the present invention, at block 207, another header, a vehicle data document header will be created that will contain the vehicle identifying data, such as the VIN, Make, Model, Color, and Year. In another embodiment of the present invention, at block 207 a subset header that will contain the vehicle identifying data will be created whereby this subset header will be a subset to the accident location header that may have been previously created that may contain the time/location data header containing the location of the accident set forth in block 204. In alternative embodiments of the present invention, data headers may be configured so that any accident headers will be headers for all vehicles and individuals involved or injured in the accident. The present invention is not limited to the specific headers discussed herein as any number of data headers may be used to assist in identifying accident data depending on a user's preference. This vehicle data document header will also be the header for all data contained in the data documents in blocks 210, 213, 216, 219, and 222.

Flow 20 may then proceed to block 208. At block 208, all of the data in the data document regarding each vehicle's identifying data that was present in block 207 will be validated. In one embodiment, the present invention will validate the reasonableness and accuracy of the data in the data document. In validating the data, the data may be compared to other data sources containing identical data. Any incorrect data will be corrected and revalidated, and if any data can not be validated, then the specific un-validated data will be annotated as such for further analysis.

In block 209, the blocks 201 and 202 are queried to obtain the driver of each unique vehicle involved in the specific accident previously queried in block 203 so that all drivers associated with the specific accident are identified. In gathering the driver data, the driver's name, date of birth, driver's address, and an identifying ID along with other data may be obtained. In one embodiment of the present invention, the identifying ID is a unique ID, such as an identifying number that may have been utilized at the scene of the accident by a presiding police officer. This identifying ID may be a driver's license number or other form of state or federal ID. The identifying ID may even be blank if no type of ID is found or used. This ID usually is recorded in an accident report for everyone involved in the accident and is a further means of identifying a person involved in the accident. In some embodiments, the present invention may extract an identifying ID from other data sources based on information captured/recorded at the scene of the accident. In alternative embodiments of the present invention, an identifying ID may be assigned by the present invention to assist in specifically identifying accident data, such as drivers, vehicles, passengers, or other involved individuals who may not have been passengers. In such an embodiment, each driver, vehicle, passenger, and other individual involved in an accident may have their own unique identifying ID. All such identifying data elements for a driver of a unique vehicle are obtained and stored in a data document illustrated by block 210. In block 210, a data document is created that will contain all of the driver's data for a specific unique vehicle. This will be completed for each unique vehicle involved in the specific accident. For example, if an accident involved 2 unique vehicles, then the present invention will gather the driver data for two drivers—one driver for each vehicle.

In block 211, all of the data in the data document regarding a specific accident that was present in block 210, such as driver's name, date of birth, driver's address and the like will be validated. In one embodiment, the present invention will validate the reasonableness and accuracy of the data in the data document. In validating the data, the data may be compared to other data sources containing identical data. Any incorrect data will be corrected and revalidated, and if any data can not be validated, then the specific un-validated data will be annotated as such for further analysis.

In block 212, the blocks 201 and 202 are queried to obtain the passengers of each unique vehicle involved in the specific accident previously queried in block 203 so that all passengers associated with the specific accident are identified. In gathering the passenger data, the passenger's name, date of birth, passenger's address, and an identifying ID, along with other data may be obtained. All such identifying data elements for a passenger of a unique vehicle are obtained and stored in a data document illustrated by block 213. In block 213, a data document is created that will contain all of the passenger's data for each specific unique vehicle and for each unique passenger identified for each unique vehicle.

In block 214, all of the data in the data document regarding a specific accident that was present in block 213, such as passenger's name, date of birth, address and the like will be validated. In one embodiment, the present invention will validate the reasonableness and accuracy of the data in the data document. In validating the data, the data may be compared to other data sources containing identical data. Any incorrect data will be corrected and revalidated, and if any data can not be validated, then the specific un-validated data will be annotated as such for further analysis.

In block 215, databases 201 and 202 are queried for anyone that was injured at the scene that was in a unique vehicle involved in the specific accident previously queried in block 203. This process obtains each injured individual's name, date of birth, address, Identifying ID, and the injury status for each unique passenger or driver for each unique vehicle. All such identifying data elements for an injured individual in a unique vehicle are obtained and stored in a data document illustrated by block 216. In block 216, a data document is created that will contain all of the injured individual's data. This will be completed for each unique vehicle involved in the specific accident and for each unique injured individual identified in the unique vehicle.

In block 217, all of the data in the data document regarding a specific accident that was present in block 216, such as an injured individual's name, date of birth, address and the like will be validated. In one embodiment, the present invention will validate the reasonableness and accuracy of the data in the data document. In validating the data, the data may be compared to other data sources containing identical data. Any incorrect data will be corrected and revalidated, and if any data can not be validated, then the specific un-validated data will be annotated as such for further analysis.

In block 218, databases 201 and 202 are queried to determine whether the driver of each unique vehicle involved in the specific accident previously queried in block 203 was issued a citation or otherwise identified as at fault. The querying in the present invention to find the "at fault" determination assists in identifying the party that may ultimately be financially responsible for the outcome of the accident. In doing so, the "at fault" driver's name, date of birth, address, Identifying ID, the specific citation issued, or reason for being labeled "at fault" is obtained.

All such identifying data elements for a driver of a unique vehicle obtained and stored in a data document illustrated by block 219. In block 219, a data document is created that will contain all of the "at fault" data of a driver of a unique vehicle. This will be completed for each unique vehicle involved in the specific accident. In one embodiment of the present invention, when analyzing an accident involving two vehicles, the invention will query data for the driver of the first vehicle and determine that this driver is at fault. After doing so, the driver of the second vehicle will also be queried to assure that the fault determination query is performed for each vehicle involved in the accident. In determining the "at fault" designation the "at fault" party may also be identified as being financially responsible for the accident and any resulting expenses stemming from the accident, such as medical expenses.

In block 220, all of the data in the data document regarding a specific accident that was present in block 219, such as the "at fault" driver's name, date of birth, address, the specific citation issued, or reason for being labeled "at fault" will be validated. In one embodiment, the present invention will validate the reasonableness and accuracy of the data in the data document. In validating the data, the data may be compared to other data sources containing identical data. Any incorrect data will be corrected and revalidated, and if any data can not be validated, then the specific un-validated data will be annotated as such for further analysis.

In block 221, databases 201 and 202 are queried to determine insurance information of a unique vehicle involved in the specific accident previously queried in block 203. In one embodiment, the present invention will only obtain the insurance information for the vehicle labeled as the "at fault" vehicle. In other embodiments, insurance information will be obtained for each unique vehicle involved in the accident regardless of which vehicle is labeled "at fault." In doing so, various data is obtained, such as the unique vehicle insurer, policy number, date of policy, coverage dates, insurance agent, and the like. This data will then be stored in a data document illustrated by block 222. In block 222, a data document is created that will contain all of the unique vehicle insurance data. This will be completed for each unique vehicle involved in the specific accident.

In block 223, all of the data in the data document regarding a specific accident that was present in block 222, such as the unique vehicle insurer, policy number, date of policy, coverage dates, insurance agent, and the like will be validated. In one embodiment, the present invention will validate the reasonableness and accuracy of the data in the data document. In validating the data, the data may be compared to other data sources containing identical data. Any incorrect data will be corrected and revalidated, and if any data can not be validated, then the specific un-validated data will be annotated as such for further analysis.

At block 224, databases 201 and 202 will be queried for anyone not in a vehicle that was involved in the specific accident previously queried in block 203 and obtain information concerning any involved individuals identified as not in a vehicle but involved in the specific accident. In doing so, various data will be obtained, such as the involved individual's name, date of birth, address, and Identifying ID, for each involved individual involved in the specific accident. This data will then be stored in a data document illustrated by block 225. In block 225, a data document is created that will contain all of the involved individual's data. This will be completed for each unique involved individual that was identified as not in a vehicle but involved in the specific accident.

At block 226, databases 201 and 202 will be queried to identify anyone not in a vehicle injured at the scene of the specific accident previously queried in block 203 and obtain information concerning anyone not in a vehicle injured at the scene, such as the injured individual's name, date of birth, address, Identifying ID, and injury status for each injured individual involved in the specific accident but not in a vehicle. This data will then be stored in a data document illustrated by block 227.

In block 227, a data document is created that will contain all of the injured involved individual's data. This will be completed for each unique injured at the scene involved person identified as not being in a vehicle but involved in the specific accident.

In block 228, all of the data in the data document regarding a specific accident that was present in block 227, such as the unique vehicle insurer, policy number, date of policy, coverage dates, insurance agent, and the like will be validated. In one embodiment, the present invention will validate the reasonableness and accuracy of the data in the data document. In validating the data, the data may be compared to other data sources containing identical data. Any incorrect data will be corrected and revalidated, and if any data can not be validated, then the specific un-validated data will be annotated as such for further analysis.

In block 229, all previously obtained data stored in blocks 204, 207, 210, 213, 216, 219, 222, and 227 are compiled and generated into an accident profile file that will contain all of the appropriate data and data document headers. This accident profile file will be completed for each specific accident that is identified and analyzed.

In block 230, an accident information database is generated that will include all accident profile files. Block 231 is the same as block 230—the accident information database.

FIG. 3 represents a continuation of flow 20. Block 232 represents a Drivers ID Database, which may be a database of the motor vehicle and driver's license database. This database may consist of one or more databases which contain a state's data on registered motor vehicles, registered drivers or individuals with a state identification ID. Block 243 represents an Insured Motorist Database, which may be a database of the vehicle and driver insurance coverage. This database 243 may consist of one or more databases which contain a state's data on insurance maintained for registered motor vehicles, or insurance maintained for driver or others forms of insurance covering a motor vehicle and/or driver.

At block 233, data contained in accident information database 230/231 will be matched or compared to the data present in Drivers ID Database 232. In doing so, each unique vehicle, driver, passenger and involved person's information in the accident information database 230/231 will be matched and compared with information in the Drivers ID Database 232. This matching/comparing process may be utilized to further validate the data in the data documents that make up the accident information database 230/231. Data matches found in the comparison will be identified and/or annotated in the accident information database 230/231. This matching comparison process will be performed for each accident profile contained in the unique accident information database 230/231.

Flow 20 may then proceed to block 234. In block 234, each individual involved in an accident in the accident information database 230/231 after validation process in block 233 is identified. All data for a unique individual involved in a specific accident is extracted, regardless of their validation status. In doing so, the involved individual's name, date of birth, address, Identifying ID, any other unique accident data and the data validation status is obtained for each involved individual in the specific unique accident. This data will then be stored in a data document illustrated by block 235. This process is completed for each involved individual identified in the unique specific accident. In block 235, a data document is created that will contain all of the involved individual's data. In an alternative embodiment, block 235 will contain all data of injured individuals involved in the specific accident. This may be completed for each involved individual identified as being involved in the specific unique accident.

In block 236, all of the data in the data document contained in block 235 (involved individual's data) will be validated. In one embodiment, the present invention will validate the reasonableness and accuracy of the data in the data document. In validating the data, the data may be compared to other data sources containing identical data. Any incorrect data will be corrected and revalidated, and if any data can not be validated, then the specific un-validated data will be annotated as such for further analysis.

Flow 20 may then proceed to block 237. In block 237, the data document(s) created in block 235 are compiled or generated into a database. In doing so, all injured individuals that have been injured in the specific unique accident will be flagged. In addition, information for each injured individual that is found in accident information database 230/231 is identified and obtained after validation block 233. All unique individual data is extracted, regardless of their validation status. This process may obtain the injured individual's name, date of birth, address, Identifying ID, and data validation status for each injured individual in the specific unique accident. All such identifying data elements for each unique involved individual including whether they were injured and injury data elements may also be compiled in block 237. This process will be completed for each involved individual identified in the specific unique accident.

Block 238 represents a paid claims database that includes paid claim data including, at a minimum, the individual's name, date of birth, address, Identifying ID, date of claim, type of injury, date of service, and amounts paid. These data elements and others will be utilized by block 239.

In block 239, claims paid for individuals involved in the specific unique accident are identified. In identifying medical claims paid, the present invention may be configured to analyze and find medical claims paid for individual involved in a specific accident for any amount of time in order to accurately capture data relating to medical expenses that are a result of the accidents. In some circumstances, individuals involved in auto accidents do not seek medical treatment directly after the accident for any number of reasons, such as lack of medical insurance or not wanting to incur medical expenses. But after weeks or months of paid/discomfort, the individual suffering from being involved in the accident will eventually seek medical treatment. The medical claims paid for this individual may also be captured so that these expenses may also be captured and analyzed to determine if there is a potential third party responsible for these medical expenses as said medical expenses are a result of the auto accident, even though the individual did not seek immediate medical treatment. In identifying claims paid, the data gathered and compiled in block 237 and the data in block 238 (paid claims database) are compared and analyzed to determine paid claims for individuals involved and/or injured in a specific unique accident. This process will flag and obtain all paid claim data for each paid claim found for an individual injured in a unique accident or each paid claim found for a service provided to an involved or injured individual after or on the date of the unique accident where the services rendered could have been because of the unique accident. In block 239, all paid claims, involved individual, injured individual and unique accident data elements will be stored in the data document identified as block 240. The steps set forth in block 239 will be completed for each involved individual identified in the unique accident.

In block 240, a data document is created that will contain all paid claim, involved individual, injured individual and unique accident data elements. This will be completed for each involved individual identified in the unique accident.

In block 241, all of the data in the data document contained in block 240 (paid claim involved and the like) will be validated. In one embodiment, the present invention will validate the reasonableness and accuracy of the data in the data document. In validating the data, the data may be compared to other data sources containing identical data. Any incorrect data will be corrected and revalidated, and if any data can not be validated, then the specific un-validated data will be annotated as such for further analysis.

In block 242, paid claims information for each individual involved in the unique accident will be identified. For each specific unique accident, paid claims data/information contained in the data document of block 240 will be combined for each involved individual. In doing so, all information for claims paid for individuals identified in a unique accident are provided in a single database. This will be completed for each specific unique accident.

At block 244, data contained in accident information database 230/231 will be matched or compared to the data present in Insured Motorist Database 243. In doing so, each unique vehicle and/or driver's information in the accident information database 230/231 will be matched and compared with information in the Insured Motorist Database 243 to find insurance information for the date of the accident in the specific unique accident information. This matching/comparing process may be utilized to obtain all insurance information such as policy information, insurer, dates of coverage and type or levels of coverage for both the unique vehicle and the unique vehicle's driver. This obtained information will then be added to the accident information database 230/231, for each vehicle involved in the specific unique accident. This process will be completed for each accident profile identified in accident information database 230/231.

At block 245, the "at fault" driver and vehicle are identified. In identifying the "at fault" driver and vehicle, all unique individual's data is extracted, regardless of their validation status. In doing so, the "at fault" vehicle/driver's name, date of birth, address, Identifying ID, VIN, make model, year color, insurer, policy information, all unique accident data and any data validation data is obtained. This data is then stored in a data document represented by block 246.

In block 246, a data document is created that will contain all of the "at fault" driver/vehicle data, such as the "at fault" vehicle/driver's name, date of birth, address, Identifying ID, VIN, make model, year color, insurer, policy information, all unique accident data and any data validation data This may be completed for each accident profile identified in the accident information database 230/231.

Flow 20 may then proceed to block 247. In block 247, all of the data in the data document contained in block 246 ("at fault" vehicle/driver's data) will be validated. In one embodiment, the present invention will validate the reasonableness and accuracy of the data in the data document. In validating the data, the data may be compared to other data sources containing identical data. Any incorrect data will be corrected and revalidated, and if any data can not be validated, then the specific un-validated data will be annotated as such for further analysis.

At block 248, the insurers of the "at fault" vehicles are identified. In identifying the "at fault" insurers, the present invention is able to identify other parties that may be financially responsible for the accident, such as the insurer of the "at fault" vehicle. Insurance data of the "at fault" vehicle is obtained from the data in block 246. In one embodiment, this insurance data may then be compared with other sources of data that can be used to further define the insurer, identify contact information, policy standards, other state data maintained on the insurer, and the like. This information may then be added to the data document obtained in Item 246 and correlated into an at fault database.

At block 249, the data contained in the database of claims paid in block 242 is correlated to the "at fault" insurer's data in the database identified at block 248 to analyze the data and determine if financial responsibility existed for the payment of claims, such as claims for medical expenses, of individuals involved in the specific unique accident. In correlating the data in 242 to the data in 248, block 249 will determine all potential financial responsible parties. For example, if medical claims data in 242 illustrates that medical expenses of $50,000.00 were paid for an individual injured in an automobile accident and a review of the "at fault" and/or financially responsible party and/or "at fault" insurer data in block 248 reveals that the "at fault" and/or financially responsible insurer or party only paid $30,000 towards the $50,000 in medical expenses, then a possible financial responsibility may be flagged for the remaining unpaid medical expenses of $20,000—indicating that the "at fault" insurer and/or the "at fault" party may be financially responsible for the remaining unpaid medical expenses. If it is determined that possible financial responsibility exists, the data from block 242 and the corresponding data from block 248 are obtained and stored in a new database of paid claims with potential third party liability represented by block 250. This process will be completed for each accident profile identified in the accident information database 230/231.

Flow 20 will then proceed to block 251. At block 251, all paid claims with potential third party liability or financial responsibility are sent for human review along with all supporting data.

While the embodiments set forth herein are related to automobile accidents, the present invention is not specifically limited to automobile accidents. In some embodiments, the present invention may be configured to analyze medical claims paid data for any type of trauma, such as boating accidents, industrial accidents, and the like.

Figure 4:
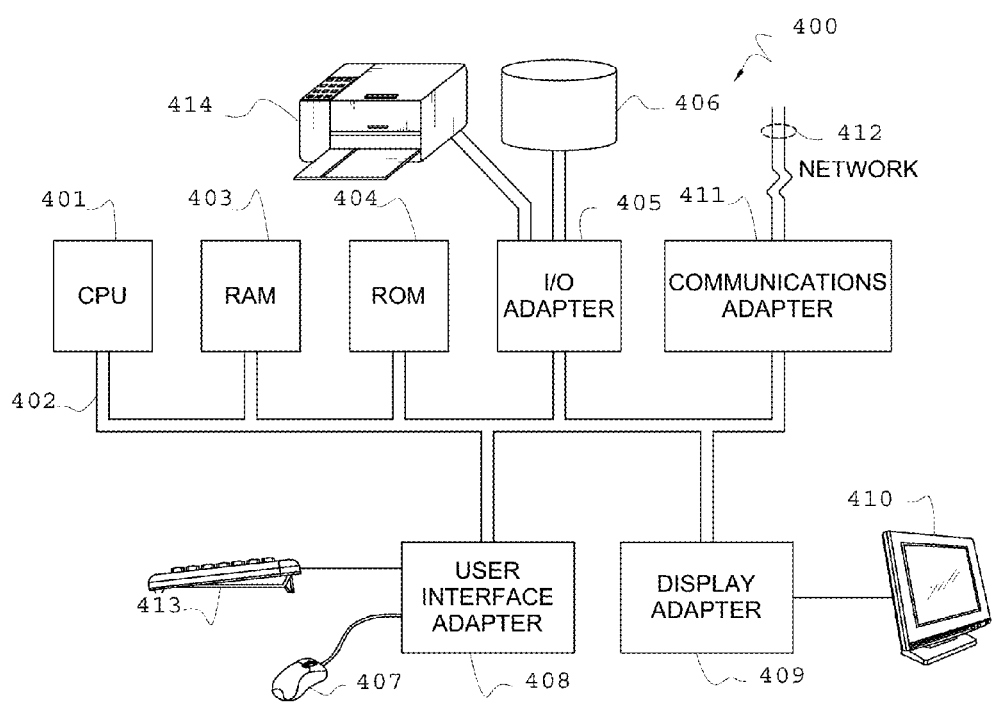
FIG. 4 depicts a block diagram of a computer system which is adapted to use an embodiment of the present invention.

FIG. 4 illustrates computer system 400 adapted to use embodiments of the present invention, e.g. storing and/or executing software associated with the embodiments. Central processing unit (CPU) 401 is coupled to system bus 402. The CPU 401 may be any general purpose CPU. However, embodiments of the present invention are not restricted by the architecture of CPU 401 as long as CPU 401 supports the inventive operations as described herein. Bus 402 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art.

Bus 402 is also coupled to input/output (I/O) controller card 405, communications adapter card 411, user interface card 408, and display card 409. The I/O adapter card 405 connects storage devices 406, such as one or more of a hard drive, a CD drive, a floppy disk drive, a tape drive, to computer system 400. The I/O adapter 405 is also connected to printer 414, which would allow the system to print paper copies of information such as documents, photographs, articles, etcetera. Note that the printer may be a printer (e.g. dot matrix, laser, etcetera.), a fax machine, scanner, or a copier machine. Communications card 411 is adapted to couple the computer system 400 to a network 412, which may be one or more of a telephone network, a local (LAN) and/or a wide-area (WAN) network, an Ethernet network, and/or the Internet network. User interface card 408 couples user input devices, such as keyboard 413, pointing device 407, etcetera to the computer system 400. The display card 409 is driven by CPU 401 to control the display on display device 410.

Although the present invention and its advantages have been described in detail, it should be understood that various changes, substitutions and alterations can be made herein without departing from the invention. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized.

The invention claimed is:

1. A method for identifying potential liability sources for medical expenses associated with automobile accidents implemented by at least one processor comprising:

querying via the processor a first database that contains multiple data records containing information about automobile accidents to isolate a specific data record associated with a specific automobile accident;

querying via the processor a second database that is different from said first database and that also contains multiple data records containing information about automobile accidents to isolate a specific data record in said second database that has commonality with said specific automobile accident;

validating via the processor data in said isolated data record in said first database and in said isolated data record in said second database by comparing the data within said isolated data record in said first database against the data within said isolated data record in said second database;

extracting via the processor automobile accident data about said specific automobile accident from one or more of:
  said isolated data record in said first database; or
  said isolated data record in said second database;

creating a unique accident identifier for said specific automobile accident via the processor;

generating via the processor a new data record that contains said unique accident identifier and said extracted automobile accident data;

generating an automobile accident information database that includes said newly generated data records;

validating via the processor said new data records within said automobile accident information database by comparing said new data records to a third database containing multiple data records containing information about one or more of:
  registered motor vehicles;
  registered drivers; and
  individuals with a government issued identification;

extracting data via the processor from said automobile accident information database about persons involved in said specific automobile accident;

storing via the processor said extracted data about said persons involved in said specific automobile accident wherein data particular to persons injured in said specific automobile accident will be flagged to identify said injured persons;

comparing via the processor said stored extracted data about persons involved in said specific automobile accident with a fourth database to identify any of said persons involved in said specific automobile accident that received an medical services and to identify any medical claims paid for any medical services provided to any of said persons wherein said fourth database includes information about medical services provided to individuals, the costs associated with said medical services, and claims paid for said medical services;

compiling via the processor data about any of said persons identified as receiving medical services and data about any of said medical claims paid or said medical services provided to said persons into a claims paid data record wherein said claims paid data record comprises:
  the identity of persons identified as receiving medical services;
  data about medical claims paid for said medical services provided to said persons identified as receiving medical services;
  data elements about said specific automobile accident;

comparing via the processor data in said automobile accident information database with a fifth database containing insurance data about drivers and vehicles to isolate insurance data about drivers and vehicles involved said specific automobile accident;

extracting via the processor said isolated insurance data and storing said extracted insurance data in said automobile accident information database;

analyzing via the processor said automobile accident information database to identify the party "at fault" for said specific automobile accident;

extracting via the processor data specific to said "at fault" party and storing said extracted "at fault" party data to an "at fault" data record foe said specific automobile accident;

identifying via the processor insurance information for said "at fault" party for said specific automobile accident;

comparing via the processor said claims paid data record to said identified insurance information for said "at fault" party to determine if any financial responsibility possibly existed for payment of any medical claims associated with said specific automobile accident; and analyzing via the processor said determination of potential financial responsibility and extracting said identified insurance information for said "at fault" party and said correlating claims paid data record and storing said extracted data into a third party potential liability database.

2. The method of claim 1 wherein said first database is an accident database and said second database is a judicial database containing data about civil suits involving automobile accidents.

3. The method of claim 2 wherein said step of extracting automobile accident data about said specific automobile accident comprises one or more of:
  extracting via the processor date and time data about said specific automobile accident;
  extracting via the processor location data about said specific, automobile accident;
  extracting via the processor vehicle identity data for all vehicles involved in said specific automobile accident wherein said vehicle identity data comprises one or more of:
    the VIN number;
    the make of the vehicle;
    the model of the vehicle;
    the color of the vehicle;
    the year of the vehicle;
  extracting via the processor driver identity data for all vehicles involved in said specific automobile accident wherein said driver identity data comprises one or more of:
    the drivers name;
    the driver's date of birth;
    the driver's address;
    the driver's license ID number;
  extracting via the processor passenger identity data for any passengers involved in said specific automobile accident;
  extracting via the processor injury data for any persons injured in said specific automobile accident wherein said injury data comprises one or more of:
    the injured person's name;
    the injured person's date of birth;
    the injured person's address;
    the injured person's injury status; and
  extracting via the processor "at fault" data for all drivers involved in said specific automobile accident wherein said "at fault" data comprises one or more of:

traffic citation data;
civil judgment data assigning fault for said specific automobile accident.

4. The method of claim 3 wherein said step of extracting automobile accident data about said specific automobile accident further comprises one or more of;
extracting via the processor insurance data for said "at fault" drivers involved in said specific automobile accident wherein said insurance data comprises one or more of:
insurance policy number;
name of insurer;
date of policy;
dates of coverage; and
identity of insurance agent.

5. The method of claim 4 wherein said step of extracting automobile accident data about said specific automobile accident further comprises one or more of;
extracting via the processor identity data of any individuals involved in said specific automobile accident that were not in a vehicle involved in said specific automobile accident; and
extracting via the processor identity data of any individuals that were injured in said specific automobile accident that were not in a vehicle involved in said specific automobile accident.

6. The method of claim 5 wherein said fifth database is an insured motorist database.

7. The method of claim 5 wherein said step of comparing said claims paid data record to said identified insurance information for said "at fault" party comprises:
analyzing via the processor all medical claims paid to any persons associated with said specific automobile accident to determine the total amount of medical services provided and to determine if there are any outstanding amounts unpaid for said medical services;
analyzing via the processor the "at fault" insurance data to determine any amounts paid by said "at fault" insurer for said medical services; and
notating via the processor the existence of a potential financial responsibility upon the existence of one or more of:
the medical claims not being paid in full;
the medical claims not being paid in full and the "at fault" insurer not making any payments toward said medical services;
the "at fault" insurer having not paid the policy limits;
the medical claims being paid by a public insurer when no payments have been made by said at fault insurer toward said medical claims.

8. The method of claim 5 further comprising the step of generating via the processor a report listing all data records in said third party potential liability database.

9. The method of claim 1 further comprising the step of:
validating via the processor said extracted automobile accident data by comparing said extracted automobile accident data against data related to said specific automobile accident contained in a source separate from said first database and said second database and identifying any incorrect data contained within said extracted automobile accident data.

10. The method of claim 9 further comprising the step of:
correcting via the processor said incorrect data;
identifying via the processor all data within said extracted automobile accident data that could not be validated.

11. The method of claim 10 wherein said step of querying a first database to isolate a specific data record comprises:

querying via the processor said accident database for a specific automobile accident; and
extracting via the processor the date and time data associated with said specific automobile accident.

12. The method of claim 11 wherein said step of querying a second database to isolate a specific data record comprises:
querying via the processor said judicial database to locate accident data corresponding to said specific automobile accident queried from said accident database; and
comparing via the processor the extracted date and time data associated with said specific automobile accident from said accident database to confirm that the located accident data queried from said judicial database matches said specific automobile accident queried from said accident database.

13. The method of claim 12 further comprising:
extracting via the processor location data associated with said specific automobile accident.

14. The method of claim 13 further comprising:
validating via the processor said date and time data and said location data associated with said specific automobile accident by comparing said date and time data and said location data associated with said specific automobile accident with a separate data source containing information relating to said specific automobile accident.

15. A computer program product comprising a non-transitory computer readable medium encoded with a plurality of instructions for controlling a processor to perform an operation of identifying potential liability sources for medical expenses associated with automobile accidents, said instructions comprising:
querying a first database that contains multiple data records containing information about automobile accidents to isolate a specific data record associated with a specific automobile accident;
querying a second database that is different from said first database and that also contains multiple data records containing information about automobile accidents to isolate a specific data record in said second database that has commonality with said specific automobile accident;
validating data in said isolated data record in said first database and in said isolated data record in said second database by comparing the data within said isolated data record in said first database against the data within said isolated data record in said second database;
extracting automobile accident data about said specific automobile accident from one or more of:
said isolated data record in said first database; or
said isolated data record in said second database;
creating a unique accident identifier for said specific automobile accident;
generating a new data record that contains said unique accident identifier and said extracted automobile accident data;
generating an automobile accident information database that includes said newly generated data records;
validating said new data records within said automobile accident information database by comparing said new data records to a third database containing multiple data records containing information about one or more of:
registered motor vehicles;
registered drivers; and
individuals with a government issued identification;
extracting data from said automobile accident information database about persons involved in said specific automobile accident;

storing said extracted data about said persons involved in said specific automobile accident wherein data particular to persons injured in said specific automobile accident will be flagged to identify said injured persons;

comparing said stored extracted data about persons involved in said specific automobile accident with a fourth database to identify any of said persons involved in said specific automobile accident that received any medical services and to identify any medical claims paid for any medical services provided to any of said persons wherein said fourth database includes information about medical services provided to individuals, the costs associated with said medical services, and claims paid tar said medical services;

compiling data about any of said persons identified as receiving medical services and data about any of said medical claims paid for said medical services provided to said persons into a claims paid data record wherein said claims paid data record comprises:
   the identity of persons identified as receiving medical services;
   data about medical claims paid for said medical services provided to said persons identified as receiving medical services;
   data elements about said specific automobile accident;

comparing data in said automobile accident information database with a fifth database containing insurance data about drivers and vehicles to isolate insurance data about drivers and vehicles involved said specific automobile accident;

extracting said isolated insurance data and storing said extracted insurance data in said automobile accident information database;

analyzing said automobile accident information database to identify the party "at fault" for said specific automobile accident;

extracting data specific to said "at fault" party and storing said extracted "at fault" party data to an "at fault" data record for said specific automobile accident;

identifying insurance information for said "at fault" party for said specific automobile accident;

comparing said claims paid data record to said identified insurance information for said "at fault" party to determine if any financial responsibility possibly existed for payment of any medical claims associated with said specific automobile accident; and analyzing said determination of potential financial responsibility and extracting said identified insurance information for said "at fault" party and said correlating claims paid data record and storing said extracted data into a third party potential liability database.

16. The computer program product of claim 15, wherein said instruction of extracting automobile accident data about said specific automobile accident comprises one or more of:
   extracting date and time data about said specific automobile accident;
   extracting location data about said specific automobile accident;
   extracting vehicle identity data for all vehicles involved in said specific automobile accident wherein said vehicle identity data comprises one or more of:
   the VIN number;
   the make of the vehicle;
   the model of the vehicle;
   the color of the vehicle;
   the year of the vehicle;
   extracting driver identity data for all vehicles involved in said specific automobile accident wherein said driver identity data comprises one or more of:
   the driver's name;
   the driver's date of birth;
   the driver's address;
   the drivers license ID number;
   extracting passenger identity data for all passengers involved in said specific automobile accident;
   extracting injury data for any persons injured in said specific automobile accident wherein said injury data comprises one or more of:
   the injured person's name;
   the injured person's date of birth;
   the injured persons address;
   the injured person's injury status;
   extracting "at fault" data for all drivers involved in said specific automobile accident wherein said "at fault" data comprises one or more of:
   traffic citation data;
   civil judgment data assigning fault for said specific automobile accident;
   extracting insurance data for said "at fault" drivers involved in said specific automobile accident wherein said insurance data comprises one or more of:
   insurance policy number;
   name of insurer;
   date of policy;
   dates of coverage; and
   identity of insurance agent;
   extracting identity data of any individuals involved in said specific automobile accident that were not in a vehicle involved in said specific automobile accident; and
   extracting identity data of any individuals that were injured in said specific automobile accident that were not in a vehicle involved in said specific automobile accident.

17. The computer program product of claim 16, wherein said instruction of comparing said claims paid data record to said identified insurance information for said "at fault" party comprises:
   analyzing all medical claims paid to any persons associated with said specific automobile accident to determine the total amount of medical services provided and to determine if there are any outstanding amounts unpaid for said medical services;
   analyzing the "at fault" insurance data to determine any amounts paid by said "at fault" insurer for said medical services; and
   notating the existence of a potential financial responsibility upon the existence of one or more of:
   a finding that the medical claims have not being paid in full;
   a finding that the medical claims have not being paid in full and the "at fault" insurer has not made any payments toward said medical services;
   a finding that the "at fault" insurer has not paid the policy limits; and
   a finding that the medical claims were paid by a public insurer when no payments have been made by said "at fault" insurer toward said medical claims.

* * * * *